United States Patent
Seegert et al.

(10) Patent No.: US 11,804,005 B2
(45) Date of Patent: Oct. 31, 2023

(54) SYSTEMS AND METHODS DIRECTED TO COMMUNICATIONS IN VIRTUAL ENVIRONMENTS

(71) Applicant: OtherSide Entertainment, Inc., Lincoln, MA (US)

(72) Inventors: Gregory Seegert, Canton, MA (US); Paul Neurath, Lincoln, MA (US)

(73) Assignee: Otherside Entertainment, Inc., Lincoln, MA (US)

( * ) Notice: Subject to any disclaimer, the term of this patent is extended or adjusted under 35 U.S.C. 154(b) by 39 days.

(21) Appl. No.: 17/741,892

(22) Filed: May 11, 2022

(65) Prior Publication Data

US 2022/0366637 A1    Nov. 17, 2022

Related U.S. Application Data

(60) Provisional application No. 63/187,166, filed on May 11, 2021.

(51) Int. Cl.
G06F 3/01      (2006.01)
G06T 15/10    (2011.01)
G06T 7/70      (2017.01)

(52) U.S. Cl.
CPC .............. *G06T 15/10* (2013.01); *G06F 3/017* (2013.01); *G06T 7/70* (2017.01); *G06T 2200/04* (2013.01)

(58) Field of Classification Search
CPC ....... G06T 15/10; G06T 7/70; G06T 2200/04; G06F 3/017
See application file for complete search history.

(56) References Cited

U.S. PATENT DOCUMENTS

| | | | |
|---|---|---|---|
| 8,184,092 B2 | 5/2012 | Cox et al. | |
| 8,576,235 B1 * | 11/2013 | Sumner | A63F 13/5258 345/473 |
| 9,984,505 B2 | 5/2018 | Rimon et al. | |
| 10,659,748 B2 | 5/2020 | Ross | |
| 2015/0022447 A1 * | 1/2015 | Hare | G06F 3/017 345/158 |

* cited by examiner

*Primary Examiner* — Robert J Michaud
(74) *Attorney, Agent, or Firm* — Lynch LLP; Sean Lynch

(57) ABSTRACT

This application is directed to system and methods that facilitate communications within virtual environments. Types of communications contemplated include non-verbal, pictographic communications. For example, the inventive subject matter can facilitate allowing users to use gesture-based inputs to apply writing to aspects of a virtual environment. When writing is applied to, e.g., a wall within a virtual environment, systems and methods of the inventive subject ensure that writing can be made visible to other users within that virtual environment, thereby facilitating a wide variety of new modes of in-game communications.

9 Claims, 5 Drawing Sheets

SYSTEMS AND METHODS DIRECTED TO COMMUNICATIONS IN VIRTUAL ENVIRONMENTS

PRIORITY CLAIM

This application claims priority to U.S. Provisional Patent Application Ser. No. 63/187,166, filed May 11, 2021. All extrinsic materials identified in this application are incorporated by reference in their entirety.

FIELD OF THE INVENTION

The field of the invention is communications within for virtual environments.

BACKGROUND

The background description includes information that may be useful in understanding the present invention. It is not an admission that any of the information provided in this application is prior art or relevant to the presently claimed invention, or that any publication specifically or implicitly referenced is prior art.

Multiplayer games and simulations set in virtual environments give rise to a need for means of in-environment communication, e.g., to help users actions coordinate actions within the environment. By far the most common method used to date is enabling real-time chat between the users. But real-time chat has downsides and constraints. For example, not all users have audio capability, some users are reluctant to use audio, not all users speak the same languages, it can be challenging to rely purely on verbal communication to clearly show positions, threats or potential actions in a 3D world, too many users at once can led to talking over each other, and verbal communication have no persistence such that effective communications rely on other users being immediately present and listening at all times.

Some games and simulations have implemented icons that can be placed in the world to augment verbal communication (e.g., virtual graffiti that is limited to set pieces), such as the equivalent of an exclamation mark to mark a threat. But these modes of communication offer only limited and abstracted ways to communicate.

Efforts have been made to develop alternative modes of communications within various virtual environments. For example, U.S. Pat. No. 9,984,505 is directed to methods of presenting, e.g., text in a virtual environment. This patent specifically contemplates rendering text in a virtual reality environment such that the text is rendered in a direction of a user's gaze (for example, text can be projected onto a surface). But this reference fails to contemplate gesture-based input to facilitate user-created pictographic communications that appear natively within a virtual environment.

U.S. Pat. No. 8,184,092, on the other hand, is directed to receiving gesture inputs and translating those gesture inputs into writing. But this reference fails to contemplate a wide variety of improvements and technical solutions that set the inventive subject matter apart. Similarly, U.S. Pat. No. 10,659,748 describes that the same virtual content can be viewed by multiple parties at the same time from different physical locations. But both these references fail to contemplate specific technical solutions that facilitate the type of in-environment communications described in this application.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that virtual environments can be manipulated to facilitate communications between users that connect to those environments via network interfaces. Thus, there is still a need in the art for alternative modes of communication that can occur in 3D virtual environments.

SUMMARY OF THE INVENTION

The present invention is directed to systems and methods of creating communications within virtual environments. In one aspect of the inventive subject matter, a method of creating communications in a virtual environment is contemplated, the method comprising the steps of: receiving a user input comprising a gesture; projecting a ray from a camera location based on the gesture; returning a first set of intersection points corresponding to a first location where the ray intersects the virtual environment; identifying a first intersection point nearest to the camera from the first set of intersection points; creating a segment starting with the first intersection point; returning a second set of intersection points corresponding to a second location where the ray intersects the virtual environment; identifying a second intersection point nearest to the camera from the second set of intersection points; adding the second intersection point to the segment; and rendering a curve using the first and second intersection points.

In some embodiments, the method can include the step of classifying each intersection point in the first and second sets of intersection points as occluded, selectable, or other. In some embodiments, the first set of intersection points has an occluded intersection point and a selectable intersection point where the occluded intersection point is closer to the camera location, and the first intersection point accordingly comprises the occluded intersection point. In some embodiments, the first set of intersection points comprises a selectable intersection point and has no occluded intersection points, and the first intersection point accordingly comprises the selectable intersection point. In some embodiments, the first set of intersection points comprises an occluded intersection point and has no selectable intersection points, and the first intersection point accordingly comprises the occluded intersection point.

The curve can be drawn in real time as the user input is received. The first intersection point can be associated with a first lifetime, such that when the first lifetime expires, the first intersection point fades. The second intersection point can similarly be associated with a second lifetime, such that when the second lifetime expires, the second intersection point fades. This can result in the curve fading away one segment at a time. The curve comprises a Hermite curve, and in some embodiments the Hermite curve can comprise a $C^1$ continuous curve.

The disclosed subject matter provides many advantageous technical effects including an ability to introduce gesture based communications into a virtual environment. Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
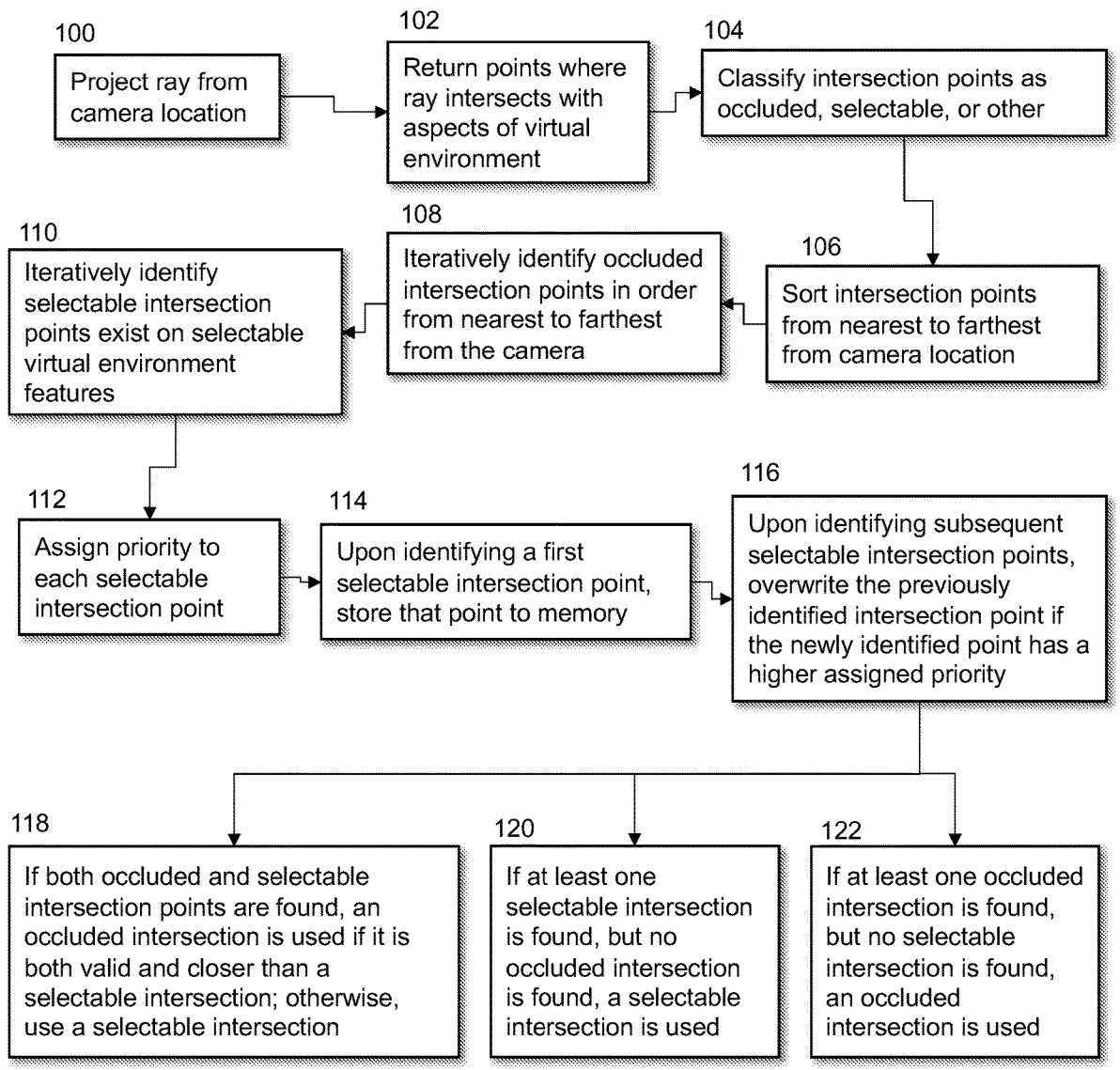
FIG. 1 is a flow chart describing how intersection points are used in embodiments of the inventive subject matter.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Embodiments of the inventive subject matter are directed to systems and methods that facilitate new modes of communication within a virtual environment (e.g., a 3D rendered environment, an augmented reality environment, a virtual reality environment, etc.). Systems and methods disclosed in this application enable users to quickly and easily introduce, e.g., hand-written and gesture-based communications into a virtual environment. The inventive subject matter facilitates creativity and free expression, and much like having ability to write or draw on paper, systems and methods disclosed in this application open up more robust means for users to communicate with one another within a virtual environment. Embodiments of the inventive subject matter can also improve communications across language and cultural barriers by, e.g., allowing users to create pictographic messages that can convey information regardless of language or culture.

Embodiments of the inventive subject matter feature a computing device (e.g., a PC, a console, a virtual/augmented reality headset, etc.) paired with at least one input device. For methods of the inventive subject matter to facilitate communications within a real-time virtual environment, users can use input devices that facilitate gesture-based input or manual input such as handwriting, such as a controller, a mouse, a VR controller, a stylus (e.g., an Apple Pencil or the like), an input device comprising any combination of accelerometers, gyroscopes, etc. to project content within the real-time virtual environment. Users can thus trace or "draw" contextual information on surfaces in a virtual environment. This capability can be compared to using a laser pointer in a virtual environment where the laser pointer can paint a surface with writing or illustration, and where the "paint" can persist for other users to view.

Projecting user communications within a virtual environment can depend on, e.g., a representation and control scheme. For example, in each rendered frame, a virtual camera projects on to the world from a predetermined "target" location. In the context of a 3D virtual environment such as a game, the predetermined target location is typically the center of a camera's viewpoint. It is contemplated that any projection of the virtual environment can be suitable (e.g., a perspective or orthographic projection). For a perspective projection, for example, target locations in near and far planes can be inverse transformed to get two world space virtual environment positions. A ray from the near plane to the far plane point can then be used to intersect with the geometry.

As used in this application, the term "occluded" refers to virtual world geometry a player's avatar cannot pass through. It is possible to define an interaction between a ray and occluded geometry in a unique way. For example, it is possible to mark some geometry with "collision flags" that are only relevant to a drawing algorithm. This allows player avatars to move freely through those geometric features, while it still appears to be "occluded" or "occluding" to a drawing algorithm.

As used in this application, the term "selectable" refers to an aspect of a virtual world that a user can see. A selectable surface, for example, is not visually hidden or occluded from the user's line of sight. If a surface or object is behind a high wall from a user's perspective, that surface would not be selectable. Or if a surface was facing away from a user's line of sight—or outside of their view cone—it would not be selectable.

Aspects of a virtual environment of the inventive subject matter can thus be classified by criteria, including occluded, selectable, or other (where other is understood to be neither occluded nor selectable).

FIG. 1 is a flow chart describing how an embodiment of the inventive subject matter works, and FIGS. 2-5 provide additional visual details by showing how such an embodiment can work within a virtual environment. According to step 100, a user first provides a drawing input (e.g., by holding a button and moving their mouse). When a user has entered a virtual environment, that user can initiate a "drawing" action according to system and methods of the inventive subject matter. How a user creates a drawing depends at least in part on the control scheme (e.g., depending on the input device, its sensors, how it is interacted with, etc.). For example, in some embodiments, a user must depress and hold a button to begin providing communicative input.

Figure 2:
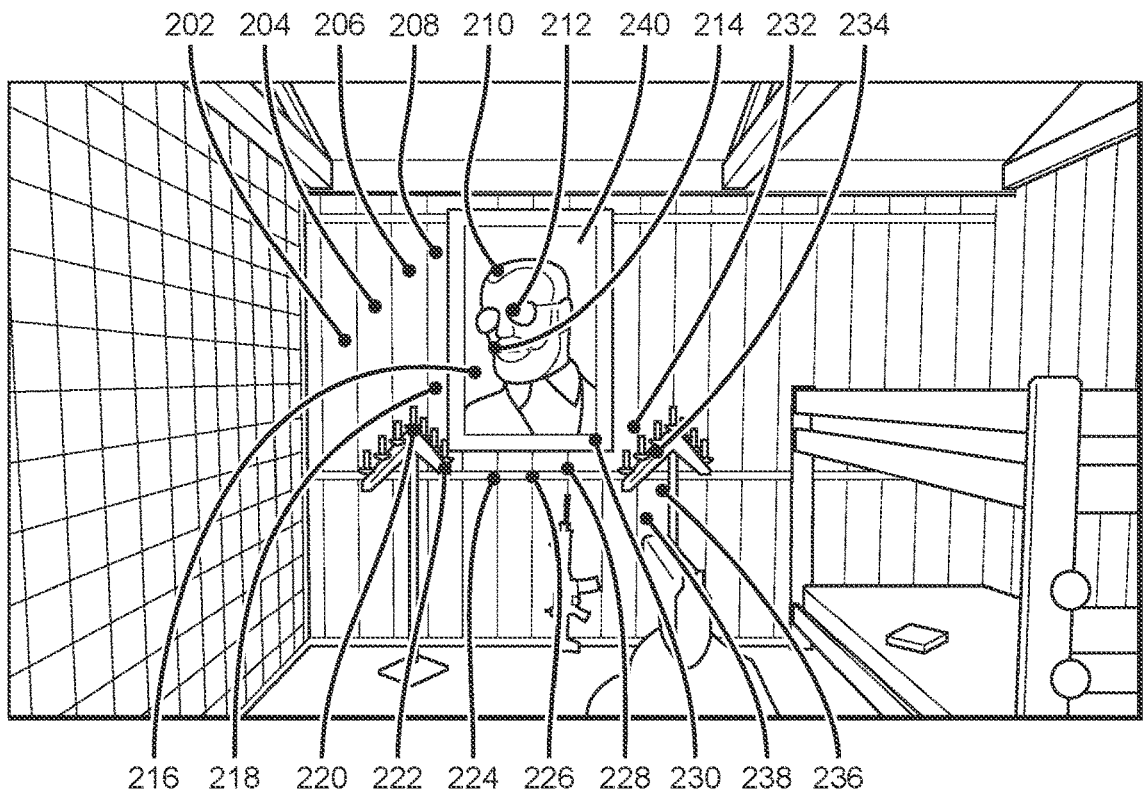
FIG. 2 shows points identified within a virtual environment.

In doing so, a ray that projects from the camera and through the user's cursor (e.g., a gun reticle or the like) is swept along a path, and, according to step 102, points that intersect with aspects of the virtual environment are returned. FIG. 2 shows an example set of points that can result. The ray described above is not visually represented anywhere and is useful for describing how points are drawn despite no actual ray ever existing.

Each of points 202-238 can include one or more intersection points that result from a ray projected from the user's camera through each rendered surface or object that it passes through. Thus, when multiple intersection points exist at a given point (e.g., a ray passes through multiple objects or surfaces), they appear coincident as viewed from the user's camera perspective.

Thus, as shown in FIG. 2, a user has moved their input device so as to create a set of intersection points that arise when a ray extending from the camera passes through virtual environment objects and surfaces. Points 202-238 thus give rise to a set of resulting intersection points. There is no maximum number of intersection points that can be generated, and the number of intersection points shown in, e.g., FIG. 2 is for demonstrative purposes only and should not be considered limiting.

As mentioned above, each of points 202-238 can represent multiple intersection points extending through the rendered virtual environment. Because FIG. 2 is rendered from only one vantage point, instances where multiple intersections exist are shown as a single point (e.g., additional points are hidden directly behind the front most points). For example, 210-216, 220-222, 230, and 234 each represent multiple intersection points. Points 210-216 and 230 each fall on painting 220, which means there is an intersection point through the painting as well as through the wall behind the painting for each point. Points 220, 222, and 234 each fall on a candlestick, which means there is an intersection point through the candlestick as well as through the wall behind the candlestick. Thus, points 202-238 give rise to a set of intersection points.

In practice, as a user moves their reticle, intersection points are identified continuously. So while FIG. 2 shows points 202-238 all laid out, each of those points is identified sequentially beginning with point 202. This is relevant for understanding the steps of FIG. 1. Thus, as a user moves their reticle to create the points shown in FIG. 2 (e.g., according to steps 100 and 102), when the reticle gets to point 210, there exist two intersection points: one on the painting and one on the wall behind the painting. Both of those intersection points are classified (e.g., as occluded, selectable, or other) according to step 104, and those intersection points are also sorted according to distance from the camera according to step 106. The intersection point on the painting is closer to the camera than the intersection point on the wall, so the intersection points are sorted such that the intersection point on the painting comes before the intersection point on the wall.

In step 108, occluded intersection points are iteratively identified from nearest to farthest from the camera among the sorted intersection points that result from the previous step, and in step 110, selectable intersection points (e.g., intersection points that exist on selectable virtual environment features) are also iteratively identified among the sorted intersection points from nearest to farthest from the camera.

The first iterative pass in step 108 is used to determine a closest occluded intersection point to a ray origin point (e.g., a location of a virtual camera). Starting with the intersection point closest to the camera, intersection points that are not occluded or selectable can be ignored, and each subsequent point is considered until an occluded intersection point is identified. A resulting occluded intersection, if any, is stored for processing after the second iterative pass in step 110.

In step 110, the second iterative pass over these points determines if any selectable intersection points exist on an aspect of the virtual environment. Next, a priority is assigned to each selectable intersection point according to step 112, and, upon identifying a selectable intersection point, that point is stored to memory according to step 114.

According to step 116, as subsequent selectable intersection points are identified, a previous (if any) selectable intersection point that has been identified is overwritten in memory by the newly identified selectable intersection point. In some embodiments, each subsequently identified selectable intersection point can overwrite a previously stored selectable intersection point if and only if the subsequent selectable intersection point has a higher priority than the previously stored selectable intersection point.

Finally, one of three different steps (118, 120, or 122) can occur, depending on what types of intersection points are present. According to step 118, if both occluded and selectable intersection points are found, an occluded intersection is used if it is both valid and closer than a selectable intersection; otherwise, the selectable intersection is used. According to step 120, if at least one selectable intersection is found, but no occluded intersection is found, the selectable intersection is used. And according to step 122, if at least one occluded intersection is found, but no selectable intersection is found, an occluded intersection is used. In other words, selectable intersection points are preferred as selectable surfaces are preferred for curve rendering described below.

When an intersection point is used according to any of steps 118, 120, or 122, that means the intersection point is added to a segment. If no segment currently exists, a new segment is created, and if neither a valid occluded intersection nor a valid selectable intersection is found, then the segment is reset.

Figure 3:
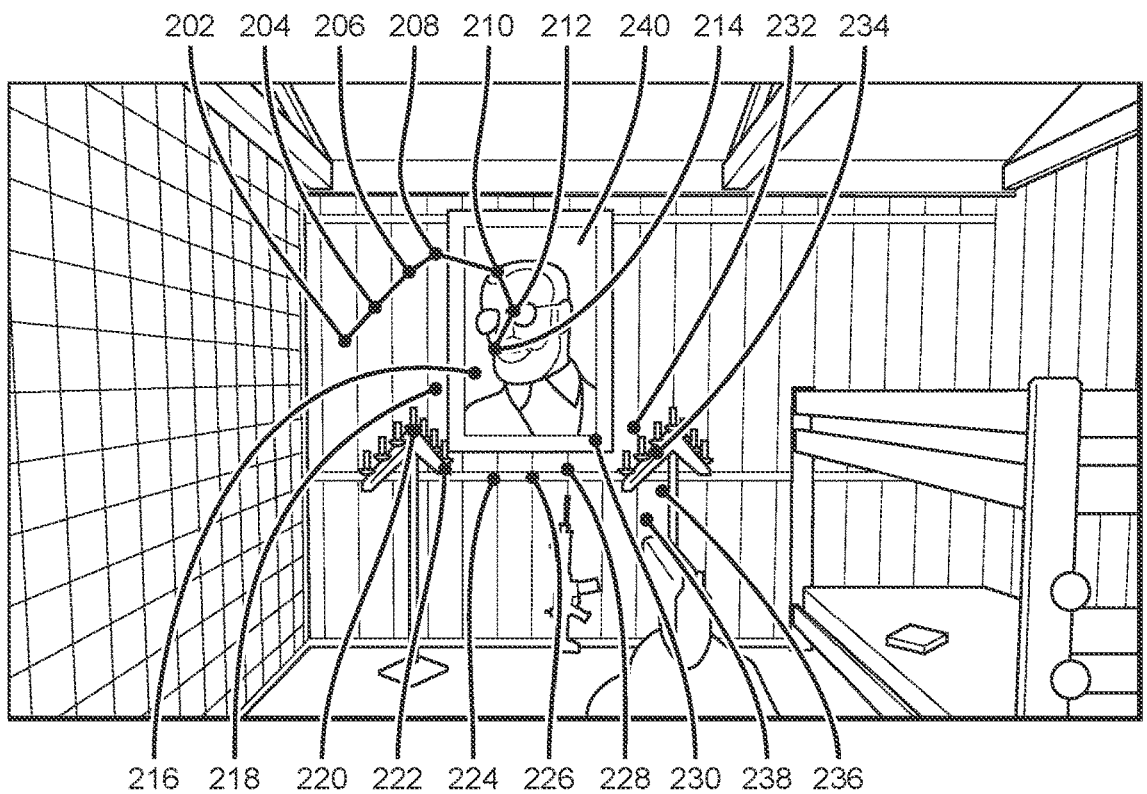
FIG. 3 shows segments built from the points identified in FIG. 2.

FIG. 3 shows how intersection points can be grouped into segments. Each segment comprises a pair of intersection points, and FIG. 3 shows segments sequentially drawn between points 202-214. Each segment is shown visually via straight line connections between the points, though in reality segments can be expressed as groupings of sequentially identified intersection points without any visual connection.

When an intersection point is stored to create a segment, a lifetime for that intersection point can also be stored. For example, each intersection point can either store a duration, which is incremented as virtual environment time elapses (e.g., how long each point has existed as a point on a segment) or can be initialized to a specified value (e.g., 3000 ms) that is decremented as virtual environment time elapses. Both are similar, but each has distinct performance advantages when used to render. For example, intersection points may fade out over time, or move towards a more recent adjacent intersection point, and when intersection points expire they can then be removed from the segment.

Other criteria that can apply to intersection points in a virtual environment of the inventive subject matter include, e.g., world object ID, position, surface normal (e.g., to determine whether a surface on which an intersection point exists is facing the camera), and relative time the point was projected. Criteria stored per point are the world. Criteria used to compare intersection points to determine whether to add those points a segment or whether to start a new segment include, e.g., world object ID, distance between intersection points, and angle between points.

For example, if a distance between the most recent intersection point exceeds a user specified threshold, or an angle between a surface normal extending from the intersection point away from the surface and a line from the user's camera to the intersection point is less than a user-specified threshold (e.g., to determine whether a surface is facing a user), the most recent intersection point can be added to a segment. If, for example, the world object ID of an intersection point is different from the world object ID of the most recent identified intersection point in a segment, and the distance exceeds a threshold, a new segment is created, and the intersection point is added to the new segment. If the point is not added to a new or existing segment, it can be appended to the most recent segment on a temporary basis, so it is visible to the user as they interact with the world. Segment order can thus be maintained by an order in which intersection points are added. Each subsequently added segment shares an initial position with a final position of a previous segment to ensure seamless connection with each previous segment.

As segments are created and added to, a curve can be fit between intersection points in real time (to generate, e.g., the curves shown FIGS. 4-7). Internally, intersection points that form continuous segments can be used to form, e.g., a Hermite curve. Any Hermite curve can be suitable, although $C^1$ continuity (e.g., where for $C^1$ the $0^{th}$ and first derivatives are continuous) is a desirable mathematical feature. $C^1$ continuous curves, such as a Catmull-Rom curve, can maintain a curve as additional intersection points are added, thus allowing for a curve to be drawn in real time based on each newly added segment. A mathematical representation of a curve can be set by a user and then used to visualize the segments.

Figure 4:
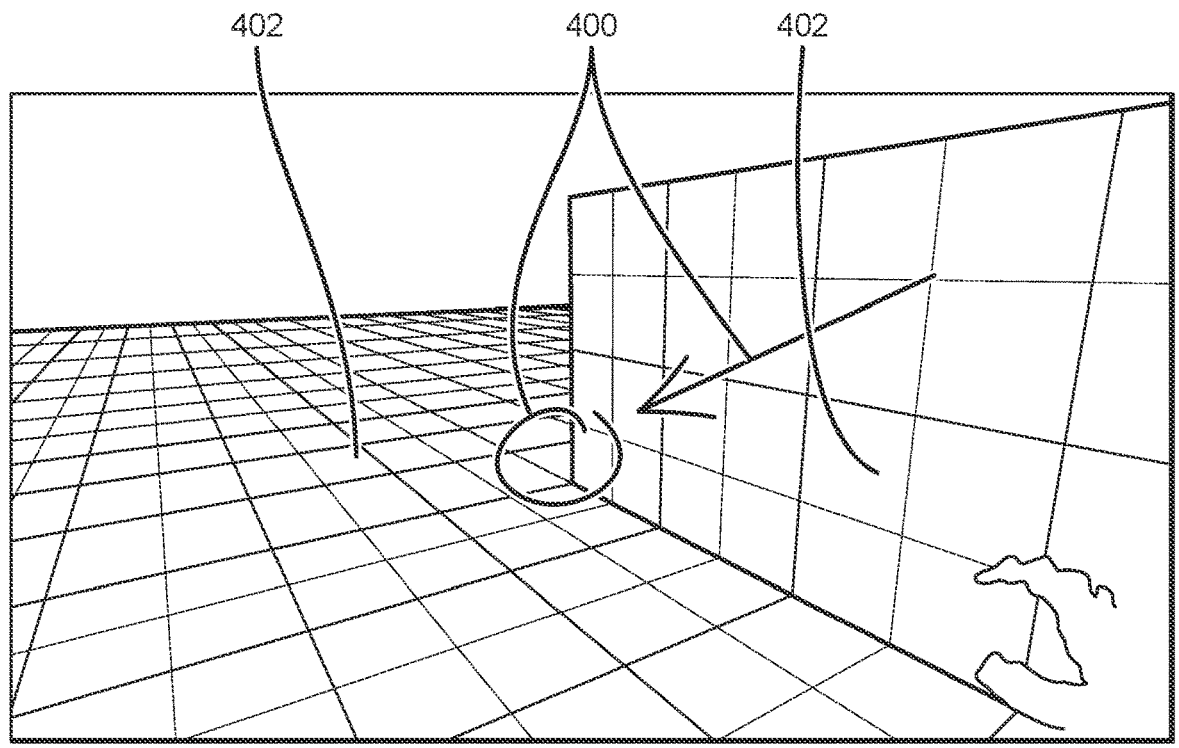
FIG. 4 shows drawings placed in a virtual environment.
Figure 5:
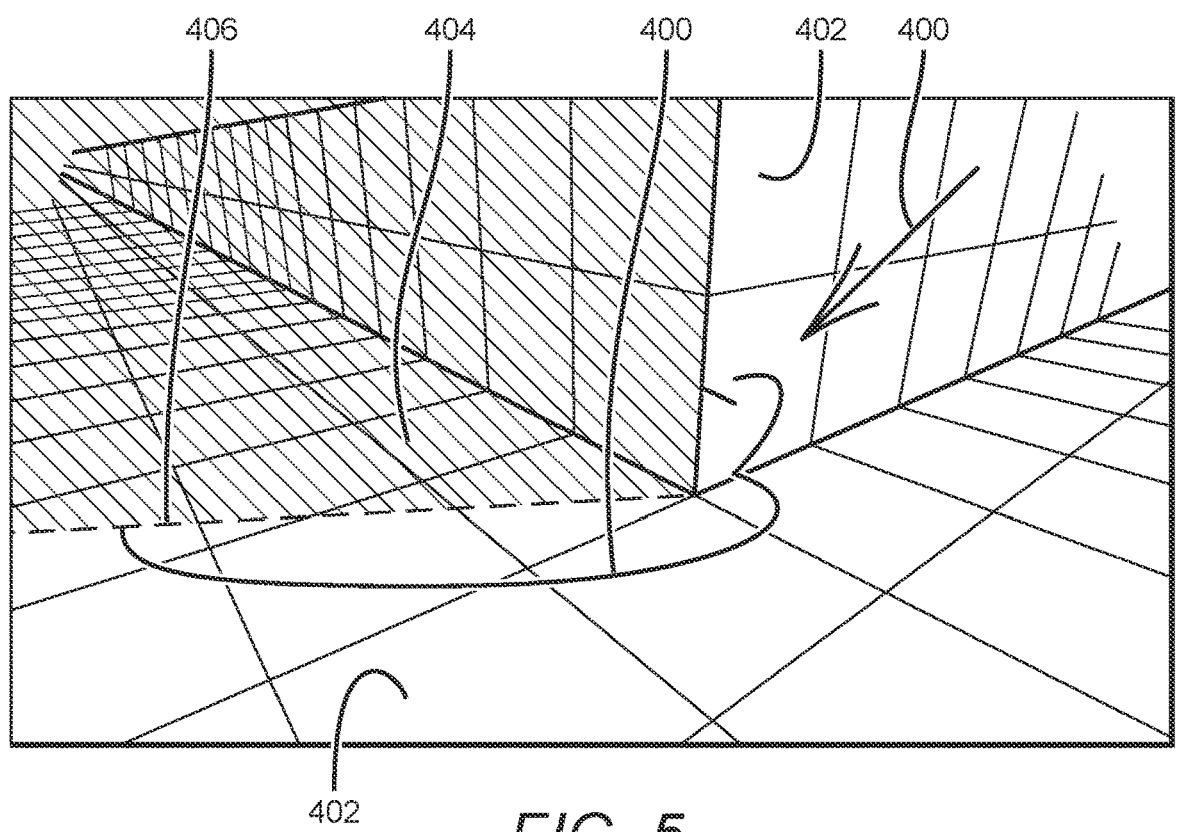
FIG. 5 shows the drawings from FIG. 4 from a different perspective.

FIGS. 4 and 5 show a curve 400 rendered on a user's screen. Curve 400 is drawn according to the steps described above. The user provides input (e.g., via mouse), and while providing that input, intersection points are identified. As intersection points are identified, segments are created. Each segment results in a curve fit between points, and as each new segment is appended, new curve segments are added. The end result is shown in FIG. 4.

FIG. 5 shows an alternative perspective of curve 400, showing off how identifying intersection points is useful in determining which surface to draw a curve on. As shown in FIG. 5, at least a portion of curve 400 is drawn on a foreground surface instead of a background surface. Foreground and background are determined from a user's perspective at the time an intersection point is identified. Thus, looking at FIG. 4, every visible surface is a foreground surface 402. But in FIG. 5, the user has moved the camera (e.g., by moving their character) such that both foreground surface 402 as well as background surface 404 (shown with line shading for emphasis) are visible. Dotted line 406 divides between foreground surface 402 and background surface 404. From the original perspective in FIG. 4, all of background surface 404 is hidden from view, but in the course of identifying intersection points, a ray projected from the camera would nevertheless intersect both the foreground surface 402 and background surface 404. Intersecting both surfaces results in multiple intersection points, and, as described above, one of steps 118, 120, or 122 is used to determine which intersection point to use (although all steps in FIG. 1 are used, these final steps determine which intersection points should be used). In the case of FIG. 5, it is shown that the intersection point on foreground surface 402 is used, thereby causing a curve to be drawn on foreground surface 402 instead of on background surface 404.

Figure 6:
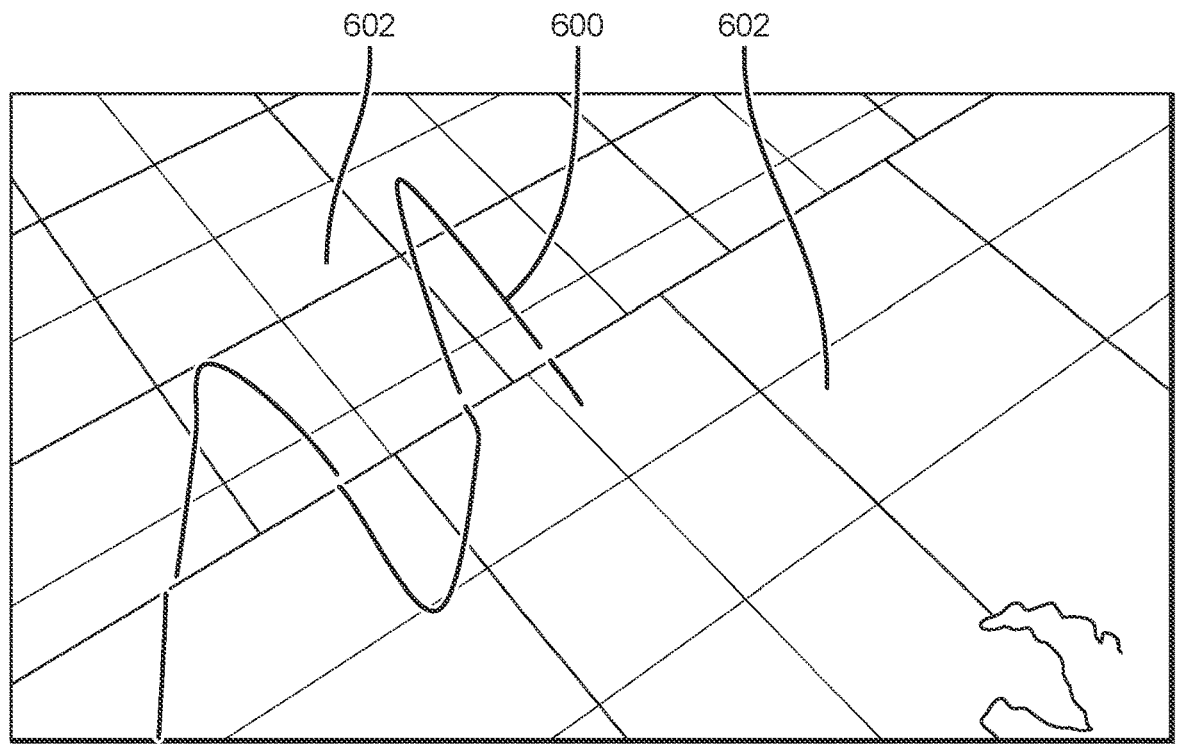
FIG. 6 shows another example of drawings placed in a virtual environment.
Figure 7:
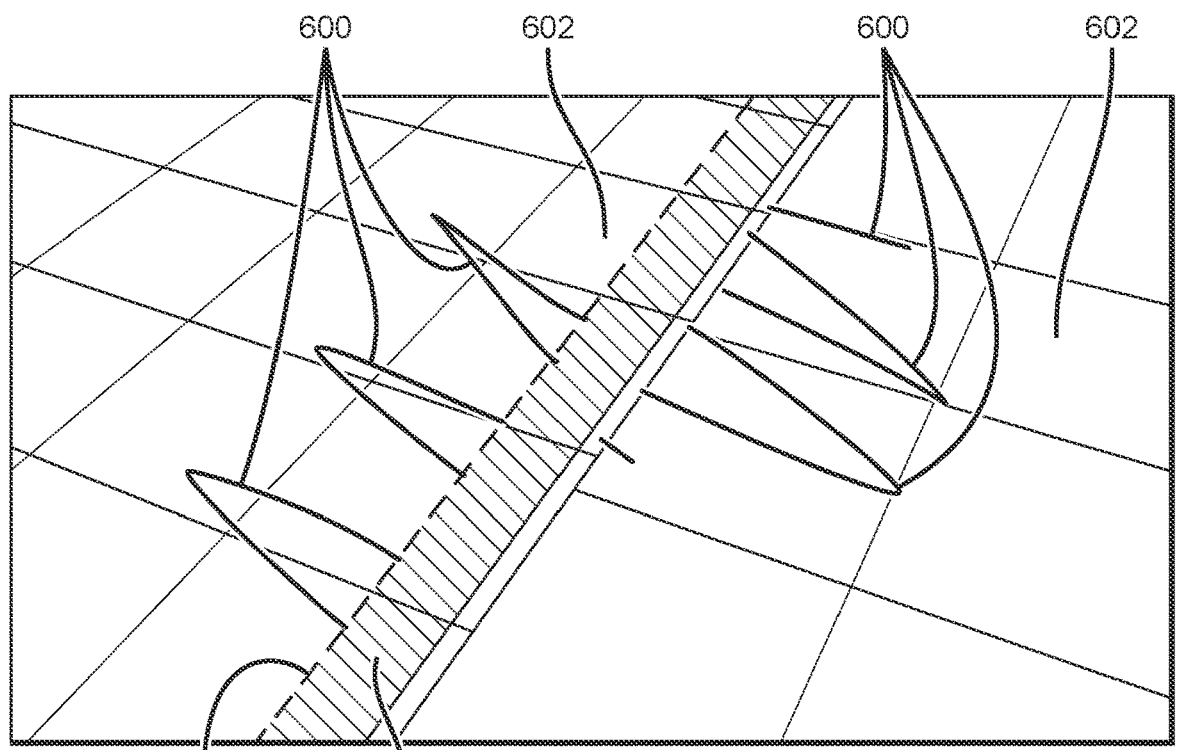
FIG. 7 shows the drawings from FIG. 6 from a different perspective.

FIGS. 6 and 7 show a similar example. In FIG. 6, a curve 600 is shown drawn on foreground surface 602. But FIG. 7 reveals, after the camera has shifted, that a portion of curve 602 is drawn on a portion of foreground surface 602 that is much closer to the camera than another portion. In other words, the user is standing atop a cliff and drawing partly on a surface at the bottom of the cliff and partly on a surface at the top of the cliff. When the camera moves, background surface 604 (shown with line shading for emphasis) is revealed, and it can be seen that curve 600 is drawn only on foreground surface 602. Again, which surface to draw on is determined by the steps described in FIG. 1, especially steps 118, 120, or 122 (e.g., depending on the types of intersection points).

Figure 8:
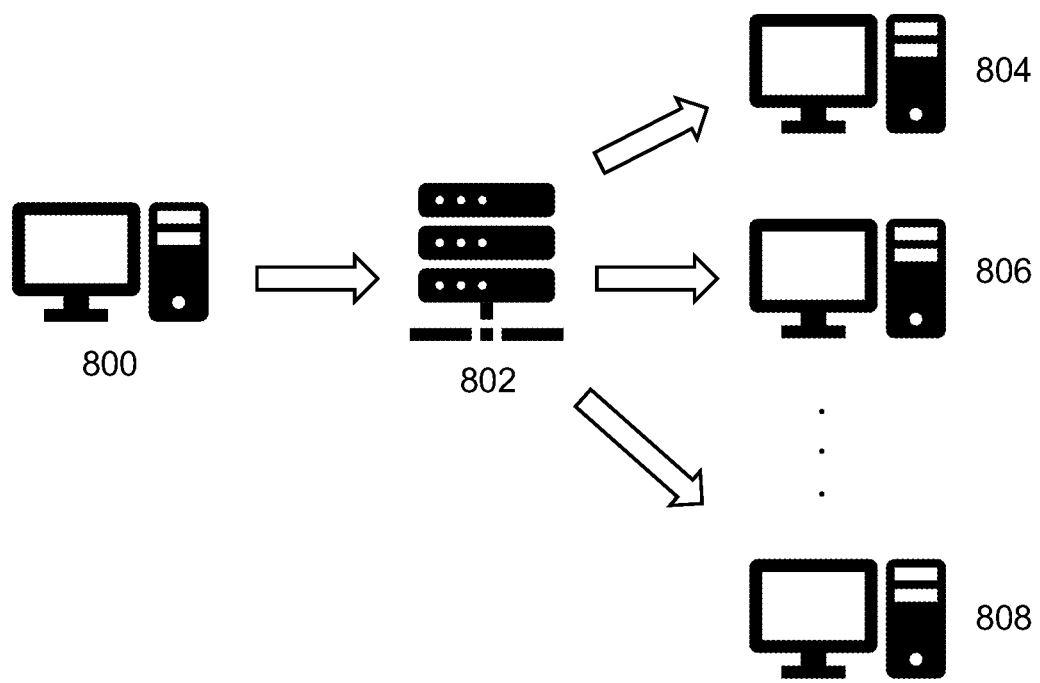
FIG. 8 shows a schematic of how a user drawing in a virtual environment interacts with a server and how the server then distributes drawing information to other users.

Curve data (e.g., intersection points, intersection point type, metadata associated with intersection points, and, in some embodiments, a curve between intersection points, segment information, and so on) can be generated locally on a per user basis. Curve data can then be stored and updated in a network environment (e.g., to a server or set of servers such as a cloud service) to persist between sessions, or to communicate the results to other users currently experiencing the same virtual environment. A curve can then be replicated on other clients via a network replication system provided by the virtual environment. This is shown schematically in FIG. 8, which shows first user 800 connected to server 802 that controls a virtual environment. When user 800 draws a curve onto the virtual environment, curve data can be transmitted to server 802, and server 802 can then distribute that curve data to receiving clients 804, 806, and 808 (e.g., when these users are also connected to server 800 to interact with the virtual environment). Although three receiving clients are shown, there is no theoretical limit to the number of receiving clients that can receive curve data.

Curve data can be used to replicate a curve drawn by any user on any receiving client's screen. Each curve can include, e.g., intersection points, and for each intersection point, a coordinate (e.g., cartesian) and lifetime can also be transmitted (and, in some embodiments, compressed before transmission). A complete curve can alternatively have a single lifetime whereby a curve expires in its entirety instead of piece-by-piece as different intersection points expire.

Receiving clients 808, 810, and 812 (e.g., other individuals interacting with the same virtual environment) thus receive curve data from user 800 (e.g., via a server or set of servers, or, in some embodiments, directly in a peer-to-peer environment). In some embodiments, curve data can be received in real time as it is generated (e.g., intersection points are sent as they are identified for use in each subsequent segment), and in some embodiments curve data is received all at once (e.g., a complete set of segments is received). Intersection points can be stored as 4-component units (e.g., a vector in a form of [X,Y,Z,W]) that facilitate representing a 3D position (e.g., [X,Y,Z]) along with a scalar value (e.g., the [W] value to express a point's lifetime). It is contemplated that data relating to the virtual environment can also be stored and sent to other users.

In some embodiments, curve data replicated by a receiving client does not need to exactly match an end result on the originating user's screen. In other words, a curve drawn on a receiving client's screen does not need to match a curve drawn on the screen of the user generating the curve, as long as the curve can be created from received curve data. This can reduce network bandwidth requirements to improve efficiency and responsiveness.

Receiving clients 808, 810, and 812 can thus locally recreate a curve using received curve data originally generated by user 800 (e.g., from intersection points and intersection point lifetime). Each intersection point that is transmitted can be added to a segment received by a receiving client, e.g., in order of the relative lifetime of each intersection point. The makes it so out-of-order network communications can still result in correct position ordering.

Figure 9:
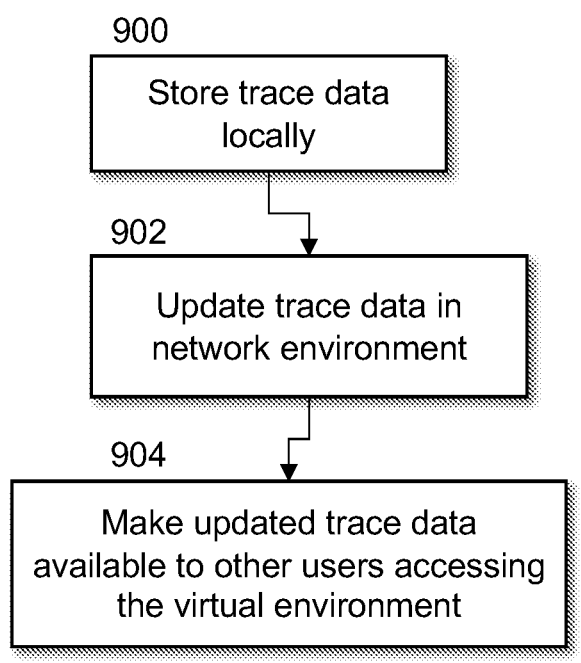
FIG. 9 is a flowchart describing some steps involved in distributing curve data from one user to many.

FIG. 9 is a flow chart generalizing how network communications associated with the inventive subject matter can take place. In step 900, curve data is stored locally. Next, in step 902, curve data is updated in a network environment based on that locally stored trace data. Finally, in step 904, updated trace data is made available to other users accessing the virtual environment.

In some embodiments, $C^1$ curves do not change shape as intersection points are appended to a segment. Newly added portions of a curve can be treated as discrete units without any dependencies on previously drawn curves. Other curve types can shift or change as the curve is updated with each newly added intersection point.

Once curve data has been transmitted and subsequently received by other users, visualization of that information can take place. Visualization of curve data is largely dependent on a desire of the virtual environment and is flexible given what segment information is provided. Choosing a $C^1$ continuous curve allows the curve equation to be sampled at various time values between points. Points along a curve that can be calculated using, e.g., a $C^1$ curve fit equation by the CPU or the GPU can be used to represent a smooth curve. In some embodiments, such points can be used to render, for example, a strip of triangle geometry that appears smooth due to the frequency the curve was sampled.

Tangents of a $C^1$ curve at each visualization fragment or pixel can then evaluated. Tangents are used to find a distance from a fragment to the curve. That distance is used to index into a texture coordinate, resulting in completely smooth and anti-aliased curves. Additionally, a curve can be visualized in two passes. Depending on how a virtual environment is implemented, occluded curve geometry viewed from different perspectives can be visualized differently to indicate occlusion.

Actual visualization of a curve can depend on the virtual environment that embodiments of the inventive subject matter are implemented within. For example, an occluded curve segment visualization can show a darker, less opaque outline of the curve, while curve segments that are not occluded can appear solid. On consumer graphics hardware, for example, this can be implemented by inverting a depth test criteria or by comparing a depth of the visualized fragment to the existing depth of the scene as perceived by the user. The term "fragment," in this context, refers to a real-time rendering term that typically involves one or more pixels. A fragment used as shading on a GPU is not always done per-pixel. Instead, shading can be performed on a 2×2 pixel block, which is referred to as a fragment.

As mentioned above, systems and methods of the inventive subject matter also allow for curves on a surface within a virtual environment to be temporary or persistent. A temporary curve is configured to fade and disappear after amount of time (e.g., 0-10 seconds, 10 seconds-1 minute, 1 minute-5 minutes, persistent, and so on, according to a lifetime associated with one or more intersection points in a segment). A persistent curve is configured to be permanent for, e.g., a session or across sessions so that users can come back to a virtual environment days or weeks later (or any amount of time).

Thus, in some embodiments, a written communication can disappear after some amount of time, or, in some embodiments, the duration can be functionally infinite (e.g., the written communication can exist until the virtual environment itself is reset). In instances where a written communication persists (e.g., infinitely or for some duration) within a virtual environment, users can take advantage of such a system to, e.g., place hints, cautions, and other communications for themselves or other users (or a subset of users, e.g., those who are "friends" with the user who places them) to view hours, days, or even forever after placing the communication. Longer durations can facilitate communications between interactive sessions—in other words, communications can be seen by other users well after the author of the communication has logged off or otherwise exited the virtual environment.

Thus, specific systems and methods directed to new modes of communication within virtual environments have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of creating communications in a virtual environment, the method comprising the steps of: receiving a user input comprising a gesture; returning a first set of intersection points corresponding to a first location where the user input intersects the virtual environment from a first perspective of a virtual camera; identifying a first intersection point nearest to the virtual camera from the first set of intersection points; creating a segment starting with the first intersection point; returning a second set of intersection points corresponding to a second location where the ray user input intersects the virtual environment from a second perspective of the virtual camera; identifying a second intersection point nearest to the virtual camera from the second set of intersection points; adding the second intersection point to the segment; and rendering a curve in the virtual environment using the first and second intersection points, wherein the curve is visible to the virtual camera.

2. The method of claim 1, further comprising the step of classifying each intersection point in the first and second sets of intersection points as occluded, selectable, or other.

3. The method of claim 1, wherein the first set of intersection points comprises an occluded intersection point and a selectable intersection point, the occluded intersection point is closer to the virtual camera location, and the first intersection point accordingly comprises the occluded intersection point.

4. The method of claim 1, wherein the first set of intersection points comprises a selectable intersection point, has no occluded intersection points, and the first intersection point accordingly comprises the selectable intersection point.

5. The method of claim 1, wherein the first set of intersection points comprises an occluded intersection point, has no selectable intersection points, and the first intersection point accordingly comprises the occluded intersection point.

6. The method of claim 1, wherein the curve is visibly rendered in real time as the user input is received.

7. The method of claim 1, wherein the first intersection point is associated with a first lifetime, and when the first lifetime expires the first intersection point fades, and wherein the second intersection point is associated with a second lifetime, and when the second lifetime expires the second intersection point fades.

8. The method of claim 1, wherein the curve comprises a Hermite curve.

9. The method of claim 8, wherein the Hermite curve comprises a $C^1$ continuous curve.

* * * * *